US007008719B2

(12) United States Patent
Zaffino

(10) Patent No.: US 7,008,719 B2
(45) Date of Patent: Mar. 7, 2006

(54) BATTERY LEAKAGE CONTAINMENT SYSTEM

(76) Inventor: Tracy L. Zaffino, 10227 Shadow Way, Dallas, TX (US) 75243

(*) Notice: Subject to any disclaimer, the term of this patent is extended or adjusted under 35 U.S.C. 154(b) by 218 days.

(21) Appl. No.: 10/461,765

(22) Filed: Jun. 13, 2003

(65) Prior Publication Data
US 2004/0253509 A1 Dec. 16, 2004

(51) Int. Cl.
H01M 2/10 (2006.01)
H01M 6/52 (2006.01)
H01M 2/36 (2006.01)
B65B 1/04 (2006.01)
F16N 31/00 (2006.01)

(52) U.S. Cl. .................. 429/49; 137/312; 141/86; 206/386

(58) Field of Classification Search .............. 429/49, 429/121–122; 206/386; 137/312; 141/86; 184/106
See application file for complete search history.

(56) References Cited

U.S. PATENT DOCUMENTS 4,484,661 A * 11/1984 Evenson .................. 184/106
4,930,632 A * 6/1990 Eckert et al. ............. 206/386
5,147,039 A * 9/1992 Sechler et al. ............ 206/386
5,454,195 A 10/1995 Hallsten
5,689,920 A 11/1997 Hallsten
5,775,869 A 7/1998 Bishop
5,981,101 A 11/1999 Stone
6,102,086 A * 8/2000 Holtby .................... 141/86
6,168,131 B1 * 1/2001 Tabatabaie ............... 249/121
6,308,728 B1 * 10/2001 Frazier ..................... 137/312
6,395,417 B1 * 5/2002 Frazier ..................... 429/49
2003/0066560 A1 * 4/2003 Frazier ..................... 137/312

* cited by examiner

Primary Examiner—Mark Ruthkosky
(74) Attorney, Agent, or Firm—Gardere Wynne Sewell LLP

(57) ABSTRACT

A leakage containment system for storage batteries supported on a rack. Plural, generally rectangular pans are interconnected to each other and are each provided with at least one end wall having a recessed portion so that excess liquid in one pan may spillover into an adjacent pan before spilling over onto a floor supporting the leakage containment system. The pans may be fabricated of coated carbon steel or stainless steel. The battery rack may be constructed to allow access to remove batteries therefrom intermediate the opposite ends of the rack and selected pans may be removed from the leakage containment system to permit access to the rack for insertion of and removal of batteries with respect to the rack.

10 Claims, 3 Drawing Sheets

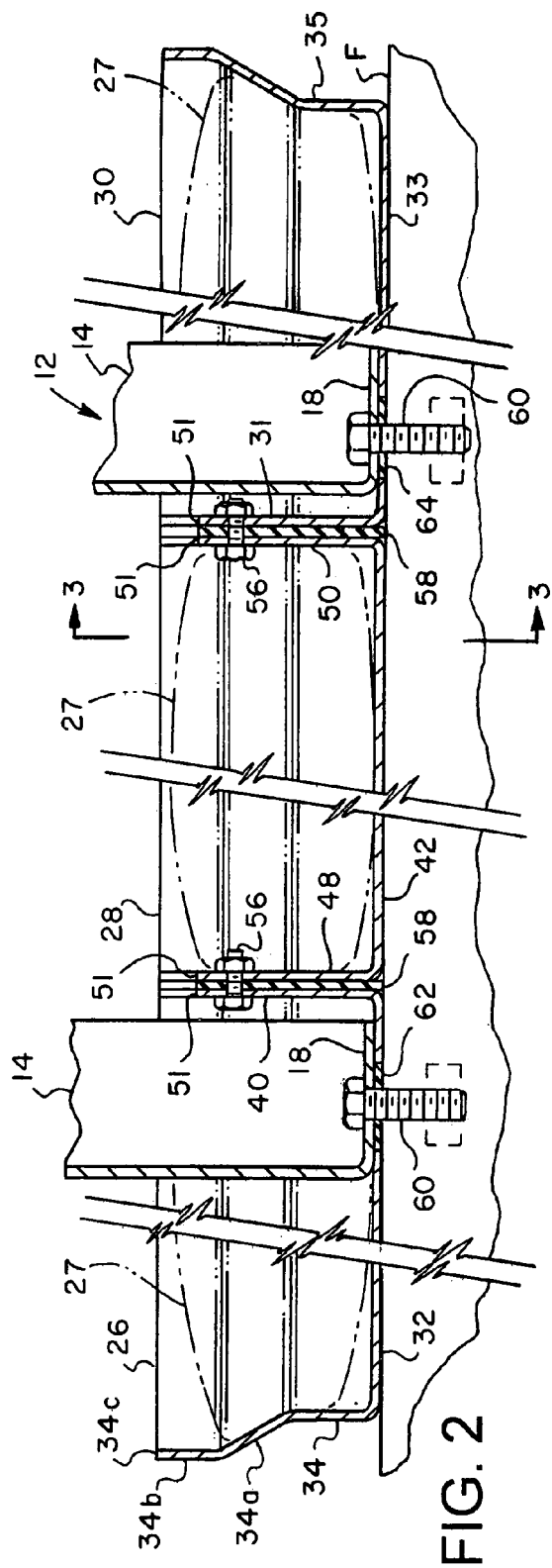
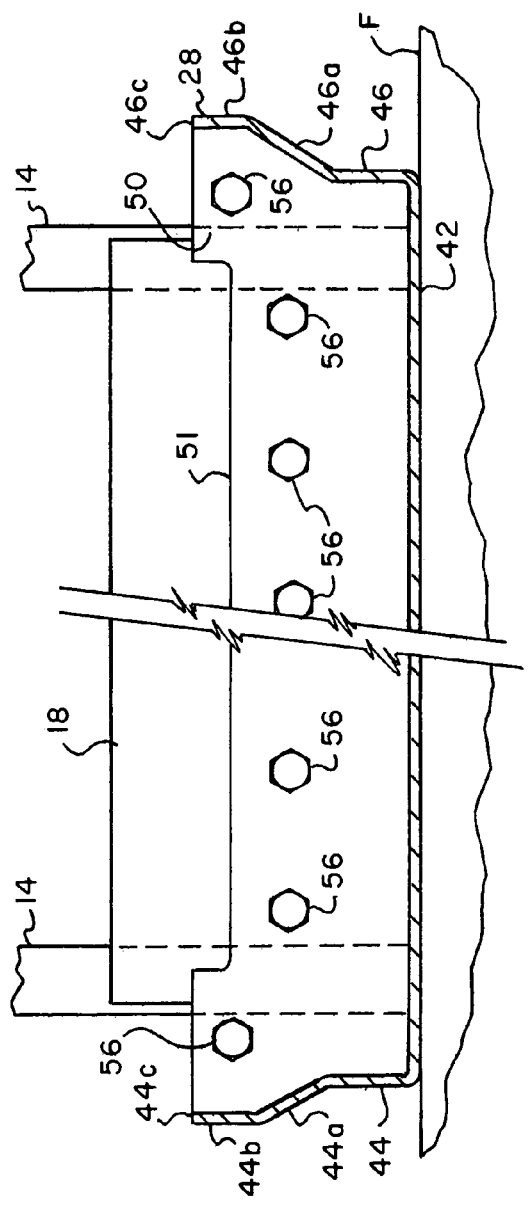

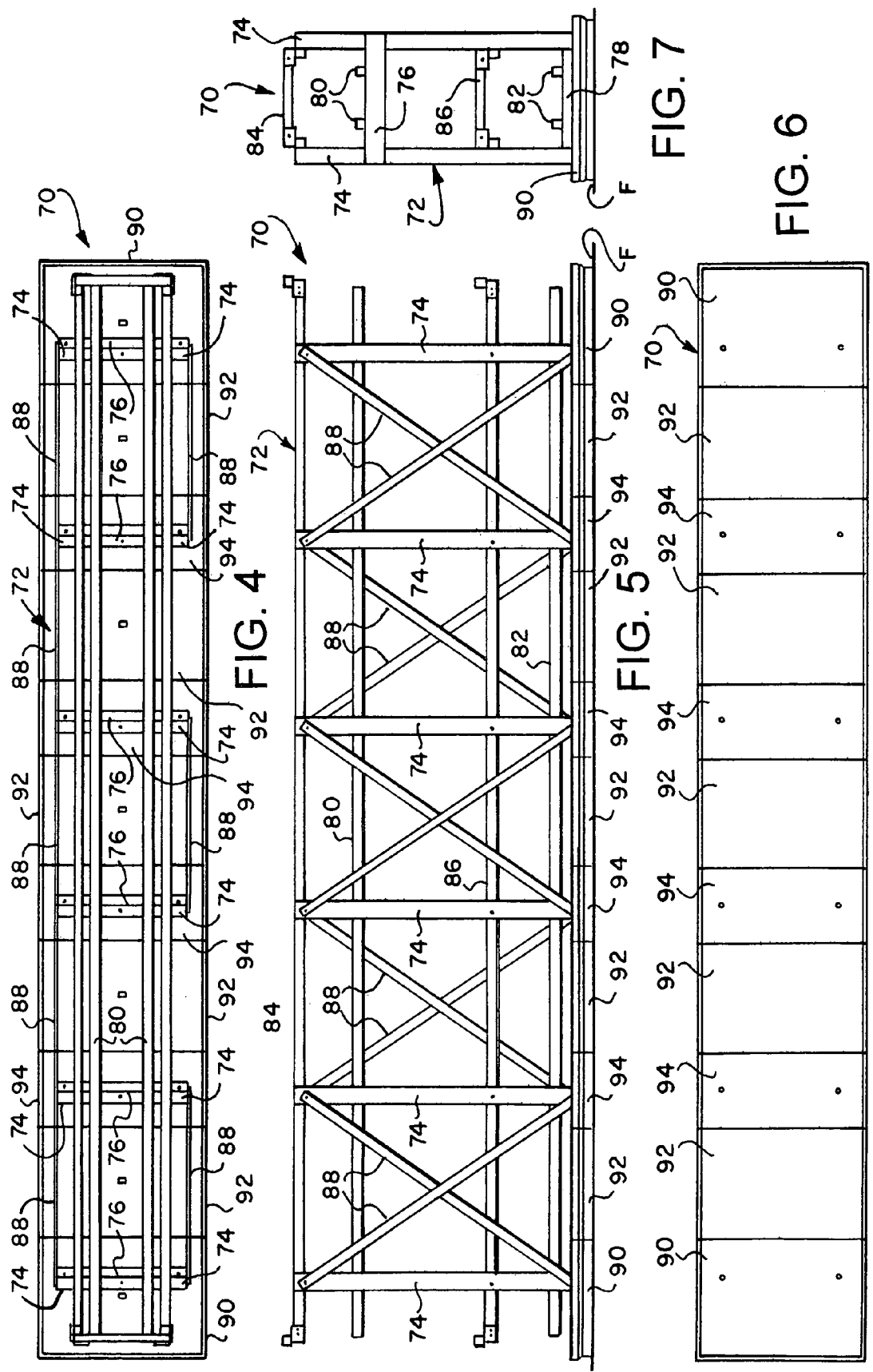

BATTERY LEAKAGE CONTAINMENT SYSTEM

BACKGROUND

Wet cell battery systems have become increasingly popular as emergency power supply and backup power supply systems for myriad applications. Such emergency or backup power supply systems require banks of multiple wet cell batteries mounted on racks and interconnected for providing emergency or backup electrical power. However, the provision of wet cell storage batteries, particularly in relatively large numbers, has dictated the need for liquid spill or leakage containment systems associated with such banks of batteries to minimize adverse affects of corrosive battery fluids.

One type of battery leakage containment system requires a multi-part rail or bracket arrangement within which is disposed a flexible, plastic, shallow, panlike liner. Such systems tend to be relatively complicated and there is the ever present concern that the thin walled plastic liner may be inadvertently damaged and allow corrosive fluids contained therein to leak out of the spill containment system. Prior art battery rack leakage or spill containment systems also suffer from the disadvantage of not providing convenient access for apparatus to move close to the battery support racks to allow movement of batteries to and from the support racks during servicing or replacement.

The continuing demand for large scale emergency or backup electrical power supply systems utilizing wet cell storage batteries and other systems requiring the use of hazardous chemicals has brought forth the need for improved leakage or spill containment systems. It is to these ends that the present invention has been developed.

SUMMARY OF THE INVENTION

The present invention provides an improved fluid leakage or spill containment system, particularly adapted for containing spillage of corrosive battery fluids from banks of multiple wet cell storage batteries and the like.

In accordance with one aspect of the present invention a battery leakage containment system is provided which is characterized by a plurality of shallow metal pans within which a battery support rack or racks are mounted. The pans are releasably but securely connected to each other and adjacent cooperative walls of the pans are of a height less than the height of the remainders of the pans so that fluid leakage into one or more pans may be contained by spilling over into adjacent pans. Since it is unlikely that fluid spillage would be severe enough to fill all pans before service work was required on the battery bank, with the present invention minor leakage or spillages are confined to one or two pans thereby minimizing the requirement for replacement of fluid absorbing and neutralizing materials which may be normally placed in corrosive or hazardous liquid spill containment or confinement systems.

In accordance with another aspect of the present invention a liquid spill containment system is provided wherein replacement of parts of the system may be done on a partial or fractional basis if damage occurs to one or more of the separable spill containment pans. In this way, it is not necessary to completely disassemble the containment system and replace a one piece liner or pan as with some prior art systems.

Still further, the present invention provides a battery leakage containment system wherein selected leakage containment pans may be temporarily removed from under battery support racks or the like to provide access for equipment to remove or add batteries to the rack system or perform other operations, as needed. Access to batteries in the middle of a bank of batteries, for example, is more easily accomplished than for battery banks associated with prior art spill containment systems.

Those skilled in the art will further appreciate the above-mentioned advantages and superior features of the invention together with other important aspects thereof upon reading the detailed description which follows in conjunction with the drawings.

BRIEF DESCRIPTION OF THE DRAWING

FIG. 2 is a section view taken generally along the line 2—2 of FIG. 1;

FIG. 3 is a section view taken generally along the line 3—3 of FIG. 2;

FIG. 4 is a top plan view of another preferred embodiment of a battery leakage containment system in accordance with the invention;

FIG. 5 is a side elevation of the system shown in FIG. 4;

FIG. 6 is a bottom plan view of the system shown in FIGS. 4 and 5; and

FIG. 7 is an end elevation of the system shown in FIGS. 4 through 6.

DETAILED DESCRIPTION OF THE PREFERRED EMBODIMENTS

Figure 1:
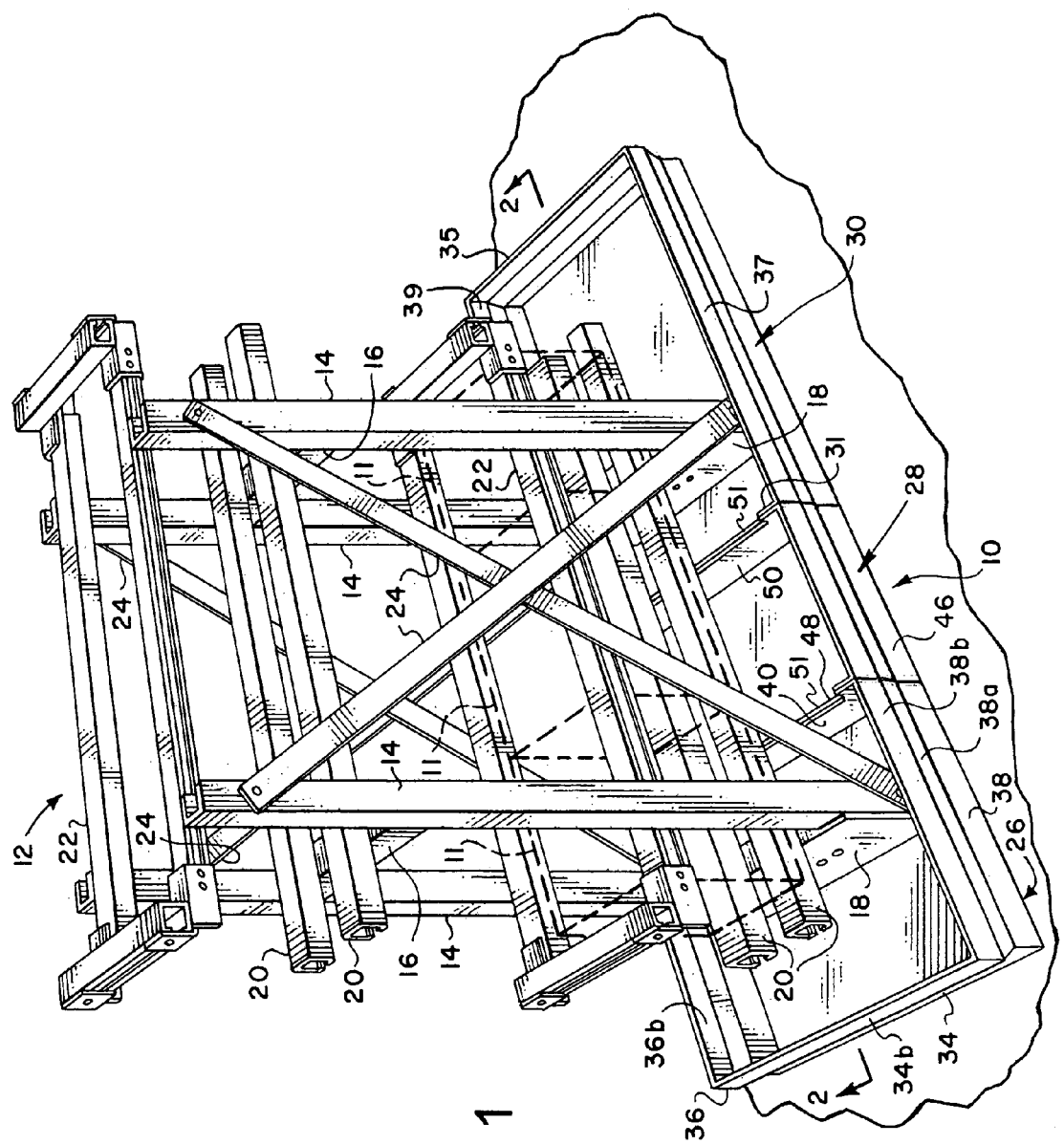
FIG. 1 is a perspective view of a battery leakage or spill containment system in accordance with one preferred embodiment of the present invention.

In the description which follows like parts are marked throughout the specification and drawing with the same reference numerals, respectively. The drawing figures are not necessarily to scale and certain features may be shown exaggerated in scale or somewhat schematically in the interest of clarity and conciseness.

Referring to FIG. 1, there is illustrated a battery leakage or spill containment system in accordance with the invention and generally designated by the numeral 10. The system 10 is shown in conjunction with a rack 12 for supporting a plurality of liquid or gel type storage batteries 11. The rack 12 is somewhat exemplary and those skilled in the art will recognize that various types of multiple battery support racks may be used in conjunction with the present invention. However, the rack 12 is characterized by spaced apart upstanding column members 14 which are interconnected by transverse frame members 16 and 18, as shown. Longitudinal vertically spaced pairs of battery support rails 20 are supported by the respective frame members 16 and 18 and spaced apart sets of battery containment brackets 22 are supported by the column members 14 and above the respective sets or pairs of rails 20. The rack 12 is also provided with respective pairs of cross brace members 24 connecting adjacent ones of the column members 14, as illustrated.

The rack 12 is disposed in its entirety within the leakage containment system 10 comprising plural, fabricated and interconnected generally rectangular pans 26, 28 and 30, as shown in FIGS. 1 and 2. Pans 26 and 30 may be identical. Referring further to FIGS. 1 and 2, spill or leakage containment pan 26 is characterized by a bottom wall 32, an outer end wall 34, opposed sidewalls 36 and 38 and an inner end wall 40. Pan 26, as well as the pans 28 and 30, may be fabricated of steel, either stainless or carbon steel suitably coated to resist corrosion, and may be provided as a stamped or cut metal part folded to form the walls 34, 36, 38 and 40 and welded at the junctions between adjacent walls to form a leakproof container. The pans 26, 28 and 30 are, preferably, formed of twelve gauge carbon steel or stainless steel, although other gauges and materials may be satisfactory. The overall height of the pans 26, 28 and 30 is preferably about four inches and the pans are dimensioned to provide a two inch perimeter space, at least, around the rack 12 on all sides. With respect to pans 26 and 30, the outer end walls and sidewalls of these pans are preferably formed with a beveled intermediate part as indicted by numerals 34a, 36a and 38a in FIGS. 1 and 2 for purposes of adding rigidity to the pan structure. Generally vertical, upper edge wall parts 34b, 36b and 38b delimit the upper sides of pan 26. Inner end wall 40 of pan 26 is substantially planar as shown in the drawing figures. Pan 30 is a mirror image part or may be identical to pan 26, and includes a bottom wall 33, opposed end walls 31 and 35 and opposed sidewalls 37 and 39.

Intermediate pan 28 is fabricated in substantially the same manner as pans 26 and 30 and includes a bottom wall 42, opposed sidewalls 44 and 46 and opposed end walls 48 and 50. Sidewalls 44 and 46 are formed with respective intermediate bevel portions 44a and 46a, which project outwardly away from each other, and vertical upper edge parts 44b and 46b, as shown in the drawing figures. Opposed end walls 48 and 50 are substantially planar. End walls 40, 48, 50 and end wall 31 of pan 30 are each, over a major portion thereof, respectively, provided with an elongated recess to allow spillover of liquid from one pan to the other if leakage liquid should rise to a level which might otherwise threaten to spill over the top edge of the other walls of the respective pans. Walls 34, 36, 38, 44, 46, 35, 37 and 39 are all, preferably, of the same height.

As shown in FIG. 3, for example, end wall 50 is relieved at an elongated recess 51 which has an upper edge approximately one-half inch below the upper edges 44c and 46c of the sidewalls 44 and 46. Recess 51 extends over a major portion of end wall 50. In like manner end walls 48, 40 and 31 include substantially identical recesses 51, FIGS. 1 and 2. In this way, if an excess amount of liquid should threaten to completely fill one of the pans 26, 28 or 30, the other pans may receive the excess liquid to prevent spillover of liquid from any one of the pans onto floor F. As shown in FIG. 2, each of the pans 26, 28, and 30 may be provided with liquid absorbent pillows and/or so-called socks 27 comprising porous fabric bags which are filled with a chemically neutralizing composition known to those skilled in the art.

Referring primarily to FIGS. 2 and 3, the pans 26, 28 and 30 are connected together, as shown, by suitable securing means, preferably plural fastener assemblies comprising machine bolt and nut assemblies 56 which extend through cooperating fastener receiving holes in the walls 40, 48, 50 and 31. Upon assembly of the pans 26, 28 and 30 to each other, a layer of sealant, such a silicone type sealant 58, see FIG. 2, is interposed the walls 40 and 48 and the end walls 31 and 50, respectively so that when the fastener assemblies 56 are tightened to secure the pans to each other, a liquid tight seal is formed between the pans 26, 28 and 30 to prevent corrosive or hazardous liquid spilling over between pans from running between the walls of the pans, respectively. The number of fastener assemblies 56 shown is exemplary and as few as one or two fastener assemblies 56 may be required depending on the stiffness and planarity of the pan end walls. Still further, the leakage containment system 10 and rack 12 are preferably secured to a substrate such as floor F by fasteners comprising suitable bolts 60, see FIG. 2. Fastener receiving openings 62 and 64 formed in the bottom walls 32 and 33 of the pans 26 and 30 are provided for receiving the bolts 60, respectively. A suitable quantity of the aforementioned silicone sealant is also applied to the openings 62 and 64 so that when the bolts 60 are secured a liquid tight seal is formed. As shown in FIG. 2, the bolts 60 may also be operable to secure the frame members 18 and thus the rack 12 to the floor F.

Referring now to FIGS. 4 through 7, an alternate embodiment of a battery bank leakage containment system is illustrated and generally designated by the numeral 70. The leakage containment system 70 is useful in conjunction with a battery support rack 72 for supporting a substantial number of liquid filled storage batteries, not shown. The rack 72 is characterized by spaced apart upstanding column members 74 which are interconnected by spaced apart transverse frame members 76 and 78 which support respective pairs of spaced apart, parallel battery support rails 80 and 82, respectively. Spaced apart sets of battery containment brackets 84 and 86 are also supported by the column members 74. Transverse cross brace members 88 extend between pairs of column members 74 along one side of rack 72, as shown in FIGS. 4 and 5, in such an arrangement wherein alternate pairs of column members 74 are braced by the brace members 88. However, on the opposite side of the rack 72, cross brace members 88 extend between adjacent ones of all of the column members 74. In this way, access to batteries on the respective rails 80 an 82 may be more easily gained from one side of the rack 72, since the cross braces 88 do not extend between each pair of column members 74.

Referring further to FIGS. 4, 5 and 6, the rack 72 is disposed in a set of leakage containment pans comprising adjacent pans 90, 92 and 94 arranged as illustrated. Column members 74 at opposite ends of the rack 72 are disposed in pans 90 while each additional set of column members is disposed in a pan 94 in generally the same arrangement as for the leakage containment system 10. However, pans 92 are not encumbered by having a structural part of the rack 72 disposed therein. The pans 90, 92 and 94 may be fabricated in the same manner as the pans 26, 28 and 30. The pans 92 and 94 correspond in all respects to the pan 28 of the containment system 10, except the pans 92 and 94 may be of different widths with respect to each other, as shown, and may be of different widths and lengths to accommodate the dimensions of rack 72. The pans 90 correspond to the pans 26 and 30 except, as with pans 92 and 94, being dimensioned to satisfy the dimensional requirements of the rack 72. Additionally, the walls of the pans 90, 92 and 94 which are contiguous with an adjacent pan are preferably provided with relief or recesses formed similar to the recesses 51 in the walls 40, 48, 31 and 50 of the pans for the leakage containment system 10. In this way, excess liquid spilled from one or more batteries supported by the rack 72 may flow from one pan to another of the containment system 70 to minimize the chance of liquid running over the tops of the sidewalls of the pans 90, 92 or 94. The pans 90, 92 and 94 may also be secured to each other in the same manner as the pans 26, 28 and 30 by plural fasteners, not shown in drawing FIGS. 4 through 7.

However, since pans 92 are not encumbered by structural portions of the rack 72 extending therewithin and fastened thereto, the pans 92 may be disconnected from adjacent pans and removed from the leakage containment system 70, as needed, to provide access to the rack 72 at the spaces between the column members 74 which are not interconnected by braces 88. This access may be via a lift truck or other lifting apparatus, not shown, which may be moved into a position to remove heavier storage batteries, not shown, from either one of the sets of support rails 80 and 82.

The leakage containment system 70 may, in all respects except as noted above, be fabricated of the same materials as the leakage containment system 10 and assembled to form a substantially leak or spill proof structure to minimize damage from corrosive liquids, such as sulfuric acid, spilled or leaking from large storage batteries and the like.

Although preferred embodiments of liquid spill or leakage containment systems, particularly for banks of liquid filled storage batteries, have been described in detail herein. Those skilled in the art will recognize that various substitutions and modifications may be made to the invention without departing from the scope and spirit of the appended claims.

What is claimed is:

1. A leakage containment system for a battery support system, said support system including a rack for supporting plural batteries, said leakage containment system comprising:

plural, shallow pans disposed substantially under said rack and arranged side-by-side and connected to each other, said pans including opposed sidewalls and opposed endwalls, said pans being secured to each other at adjacent endwalls by mechanical fasteners, said adjacent endwalls of selected ones of adjacent pans including at least a portion having an overall height less than the remaining walls of said selected ones of said pans, respectively, to allow spillover of liquid between adjacent pans to minimize spillover from said leakage containment system; and selected ones of said pans are disposed between others of said pans which contain at least part of said rack for removal from said leakage containment system without removing said rack from said others of said pans.

2. The containment system set forth in claim 1 including:
   a sealant provided between adjacent endwalls of said pans.

3. The containment system set forth in claim 1 wherein:
   at least selected ones of said sidewalls and said endwalls of said pans are provided with a bevel portion to strengthen said pans, respectively.

4. The containment system set forth in claim 1 wherein:
   said pans are fabricated of one of carbon steel and stainless steel, respectively.

5. The containment system set forth in claim 1 wherein:
   said rack is disposed within at least selected ones of said pans in its entirety.

6. A battery fluid leakage containment system in combination with a battery support system, said support system including a rack for supporting plural batteries, said leakage containment system comprising:

plural, shallow pans disposed under said rack and arranged side-by-side, said pans including opposed sidewalls and opposed planar endwalls, said pans being substantially contiguous with each other and releasably connected to each other, at adjacent endwalls, at least intermediate portions of said adjacent endwalls disposed between opposed upper edges of said adjacent endwalls, respectively, have an overall height less than said opposed upper edges of said adjacent endwalls and less than said sidewalls of said pans, respectively, to allow spillover of battery fluid between adjacent pans to minimize battery fluid spillage from said leakage containment system.

7. The combination set forth in claim 6 wherein:
   said pans are connected at said adjacent endwalls by mechanical fasteners, respectively.

8. The combination set forth in claim 6 wherein:
   at least selected ones of said pans include sidewalls and one endwall which are provided, respectively, with a bevel portion to strengthen said pans, respectively.

9. A battery, fluid leakage containment system in combination with a battery support system, said support system including a rack for supporting plural batteries, said rack including spaced apart upstanding columns, said leakage containment system comprising:

plural, shallow pans disposed substantially under said rack and arranged side-by-side, said pans including opposed sidewalls and opposed endwalls, said pans being releasably connected to each other at adjacent endwalls, said adjacent endwalls of selected ones of adjacent pans including portions intermediate opposed upper edges of said endwalls having a height less than said opposed upper edges of said endwalls, respectively, to allow spillover of battery fluid between adjacent pans to minimize battery fluid spillage from said leakage containment system; and selected ones of said pans are disposed between others of said pans which collectively support all of said columns of said rack whereby said selected ones of said pans are operable to be disconnected from said others of said pans for removal from said leakage containment system without removing said columns of said rack from said others of said pans.

10. The containment system set forth in claim 9 including:
    a sealant provided between adjacent endwalls of said pans.

* * * * *